United States Patent
Baid et al.

(10) Patent No.: US 11,392,434 B1
(45) Date of Patent: Jul. 19, 2022

(54) CONTROLLER FOR OFF-CLUSTER OPERATIONS

(71) Applicant: MICROSOFT TECHNOLOGY LICENSING, LLC, Redmond, WA (US)

(72) Inventors: Akash Baid, Boston, MA (US); Yamini Sridaran, Bangalore (IN); Ronald Mark Parker, Manchester, MA (US)

(73) Assignee: MICROSOFT TECHNOLOGY LICENSING, LLC, Redmond, WA (US)

(\*) Notice: Subject to any disclaimer, the term of this patent is extended or adjusted under 35 U.S.C. 154(b) by 0 days.

(21) Appl. No.: 17/243,514

(22) Filed: Apr. 28, 2021

(51) Int. Cl.
*G06F 9/54* (2006.01)

(52) U.S. Cl.
CPC .............. *G06F 9/547* (2013.01); *G06F 9/546* (2013.01)

(58) Field of Classification Search
CPC .................................. G06F 9/546; G06F 9/547
See application file for complete search history.

(56) References Cited

U.S. PATENT DOCUMENTS

| | | | |
|---|---|---|---|
| 10,505,830 B2 | 12/2019 | Mishalov et al. | |
| 2020/0228402 A1 | 7/2020 | Parker | |
| 2020/0241863 A1* | 7/2020 | Duvur | G06F 8/65 |
| 2021/0227024 A1* | 7/2021 | Glass | G06F 9/5038 |
| 2021/0311763 A1* | 10/2021 | Beard | G06F 8/65 |
| 2021/0409346 A1* | 12/2021 | Thoemmes | H04L 47/821 |
| 2022/0027217 A1* | 1/2022 | Thoemmes | G06F 9/542 |
| 2022/0050720 A1* | 2/2022 | Dumba | G06F 9/45558 |

OTHER PUBLICATIONS

"Controllers", Retrieved from: https://web.archive.org/web/20201111225309/https:/kubernetes.io/docs/concepts/architecture/controller/, Nov. 11, 2020, 3 Pages.

"Kubernetes cluster monitoring (via Prometheus)", https://web.archive.org/web/20201128174206/https:/grafana.com/grafana/dashboards/315, Nov. 28, 2020, 8 Pages.

"Non Provisional Application Filed in U.S. Appl. No. 17/006,286", filed Aug. 28, 2020, 56 Pages.

Kaleem, Muhammad Zarak Bin, "Monitoring Kubernetes Clusters Through Prometheus & Grafana", Retrieved from: https://www.magalix.com/blog/monitoring-of-kubernetes-cluster-through-prometheus-and-grafana, Aug. 18, 2020, 6 pages.

(Continued)

*Primary Examiner* — Jeong S Park
(74) *Attorney, Agent, or Firm* — Newport IP, LLC; Han K. Gim

(57) ABSTRACT

Techniques are disclosed for providing a native general-purpose controller for reconciling desired states for resources across a plurality of Kubernetes clusters in a cloud computing environment. An indication is received of one or more custom resources of the cloud computing environment. An API is instantiated at each of the Kubernetes clusters that are to be accessed. In response to receiving an indication that a desired state of one of the objects does not match a current state of the one object, a message is sent that indicates an action to reconcile the desired state with the current state. A message is received that indicates that the action to reconcile the desired state with the current state has been completed.

20 Claims, 5 Drawing Sheets

(56) References Cited

OTHER PUBLICATIONS

Kolhe, Chetan, "Monitoring Kubernetes clusters with Prometheus and Grafana", Retrieved from: https://www.opcito.com/blogs/monitoring-kubernetes-clusters-with-prometheus-and-grafana, Jun. 13, 2019, 9 Pages.

Lokanath, Savithru, "Project Agumbe: Share Objects Across Namespaces in Kubernetes", Retrieved from https://engineering.salesforce.com/project-agumbe-share-objects-across-namespaces-in-kubernetes-1fc2e1ddb3eb, Jan. 22, 2021, 15 Pages.

* cited by examiner

CONTROLLER FOR OFF-CLUSTER OPERATIONS

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines or containers that appear and operate as independent computing resources. The data center can create, maintain or delete virtual machines or containers in a dynamic manner. Many platforms use Kubernetes as a container orchestration system for application deployment, scaling, and management. Within a given Kubernetes cluster, there is typically a well-defined API that enables entities to communicate within the cluster. It is with respect to these considerations and others that the disclosure made herein is presented.

SUMMARY

Within a given Kubernetes cluster, there is typically a well-defined API that enables entities to communicate within the cluster. However, there is no standardized mechanism by which a cluster can communicate with external entities. Such communications typically require specialized interfaces.

Kubernetes controllers are one type of commonly used software implementation pattern in the Kubernetes orchestration framework. Kubernetes controllers provide a way to reconcile the current and desired states of one or more resources in a framework. The controllers follow a watch/difference/act loop by continuously watching for objects of interest, calculating the difference between what it finds and the user-desired state for those objects, and finally taking appropriate actions to make the current state as close as possible to the desired state. For example, if it is desired to run three instances of a particular application, then a controller can be executed with a desired goal of 3 instances, where the current state is 0.

Typically, the watch and act parts of this loop, as well as the user-defined desired state, are completely contained within the same cluster, i.e., the user creates a configuration on a cluster for objects in that cluster and the actions that the controller takes are to interact with other parts of the same cluster via API calls. However, for some controller instances such as load balancers, the act portion of the loop may result in sending of API calls outside of the cluster. This would typically require the create of a narrowly defined controller with specific and limited interaction with out-of-cluster entities.

The present disclosure provides a general-purpose Kubernetes controller which takes the desired state information in a given cluster but opens up the watch and act parts of the loop to out-of-cluster entities. Rather than setting up and running controllers on each cluster, a centralized general-purpose Kubernetes controller can be created as a meta-resource.

The general-purpose Kubernetes controller provides a standardized way to create a centralized custom resource object and specify actions that require access to multiple clusters. In one embodiment, a custom resource object can be created in a different cluster which in turn can be acted upon by a domain-specific controller running in that cluster. With this mechanism, objects in several remote clusters can be controlled in an efficient manner by declaring the desired state on the general-purpose Kubernetes controller.

In an embodiment, the general-purpose Kubernetes controller, in the central cluster where the controller is running, may communicate via API calls to remote Kubernetes clusters in order to create, watch, update, and delete objects in remote clusters based on user-defined inputs in the custom resource object. The general-purpose Kubernetes controller may take as input metadata including the API, entity URL or identifier, access credentials, desired states, and other information needed to run the controller. The files that describe the desired set of Kubernetes resources can be defined by a Helm chart.

By providing such a general-purpose Kubernetes controller, data centers may operate more efficiently, and reduction or loss of services provided by service providers may be avoid or mitigated, providing for greater operational efficiency for service providers.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
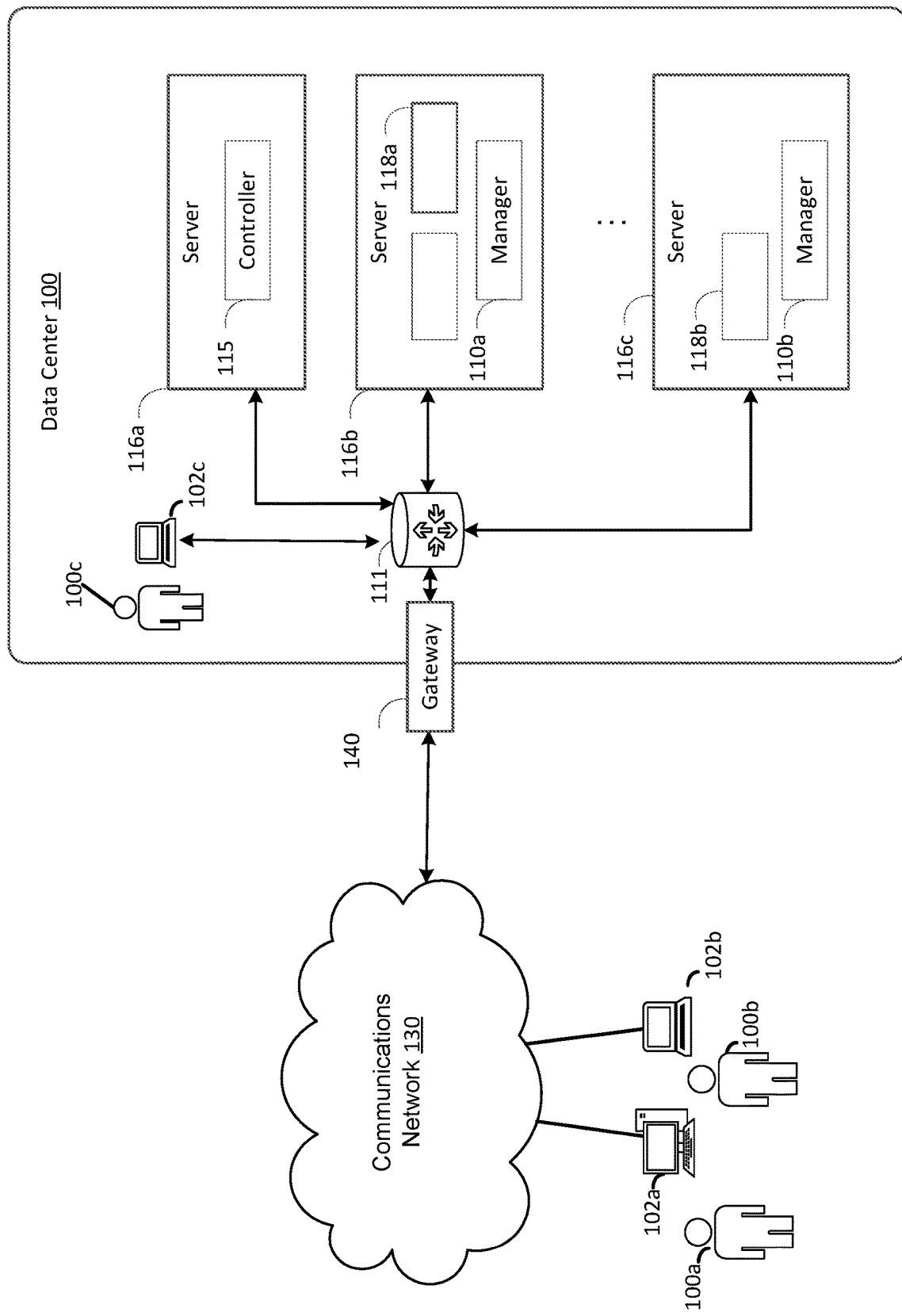
FIG. 1 is a diagram illustrating a data center in accordance with the present disclosure.

Kubernetes controllers are commonly used software implementation patterns through which the logic of reconciling the current and desired state of one or more well defined resources may be implemented in the Kubernetes orchestration framework. The controllers follow a watch, difference, act loop by continuously watching for objects of interest, calculating the difference between what it finds and the user-desired state for those objects, and finally taking actions to make the current state as close as possible to the desired state. Typically, the watch and act parts of this loop, as well as creation of the user-defined desired state, are completely contained within the same cluster, i.e., the user creates a configuration on a cluster for objects in that cluster and the actions that the controller takes are to interact with other parts of the same cluster via API calls. In some controller instances, such as load balancers, the act portion of the loop may result in the sending of API calls outside the cluster. However, these controllers are typically narrowly defined controllers with specific and limited interaction with our-of-cluster entities.

The following Detailed Description describes technologies that provide a general-purpose Kubernetes controller which is configured to receive the desired state information in a given cluster an open the watch and act parts of the loop to out-of-cluster entities. Rather than setting up and running controllers on each cluster, a centralized general-purpose Kubernetes controller is provided as a meta-resource. The general-purpose Kubernetes controller provides a standardized way to create a centralized custom resource object and specify actions that require access to multiple clusters.

In one embodiment, a custom resource object can be created in a different cluster which in turn can be acted upon by a domain-specific controller running in that cluster. With this mechanism, objects in multiple remote clusters can be controlled in an efficient manner by declaring the desired state on the general-purpose Kubernetes controller. The general-purpose Kubernetes controller, in the central cluster where the controller is running, may communicate via API calls to remote Kubernetes clusters in order to create, watch, update, and delete objects in remote clusters based on user-defined inputs in the custom resource object. The general-purpose Kubernetes controller may receive as input metadata including the API, entity URL or identifier, access credentials, desired states, and other information needed to run the controller. In an embodiment, the files that describe the desired set of Kubernetes resources can be defined by a Helm chart.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

One example implementation may be to manage creation, deletion, updates of Grafana dashboards in a server deployed off-cluster via custom resource objects defined in a central cluster. In this use-case, the general-purpose Kubernetes controller takes the users input via the custom resource objects, uploads dashboards to a remote Grafana server via POST/PUT API calls, and watches for changes in those dashboards via GET API calls.

The present disclosure enables self-contained orchestration patterns which would have otherwise required an external mechanism overseeing and interacting with multiple clusters. The general-purpose Kubernetes controller allows for objects in multiple Kubernetes clusters to be connected in various ways including: 1) hub-and-spoke, where the desired state is created by a user in a single Kubernetes cluster which are then distributed to multiple other Kubernetes clusters, or 2) mesh, where users can create different kinds of desired states in various connected clusters that affect the running instances in one or more of the other clusters.

FIG. 1 illustrates one example of a general computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a,102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines or containers 118a and 118b (which may be referred to herein singularly as "a virtual machine 118" or in the plural as "the virtual machines 118" or as "a container 118" or in the plural as "the containers 118"). The virtual machines or containers 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines or containers on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a,102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a,102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines or containers 118 on servers 116, for example.

It should be appreciated that although the embodiments disclosed above are discussed in the context of virtual machines and containers, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The disclosed embodiments may be implemented in a mobile edge computing (MEC) environment implemented in conjunction with a 4G, 5G, or other cellular network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

Figure 2:
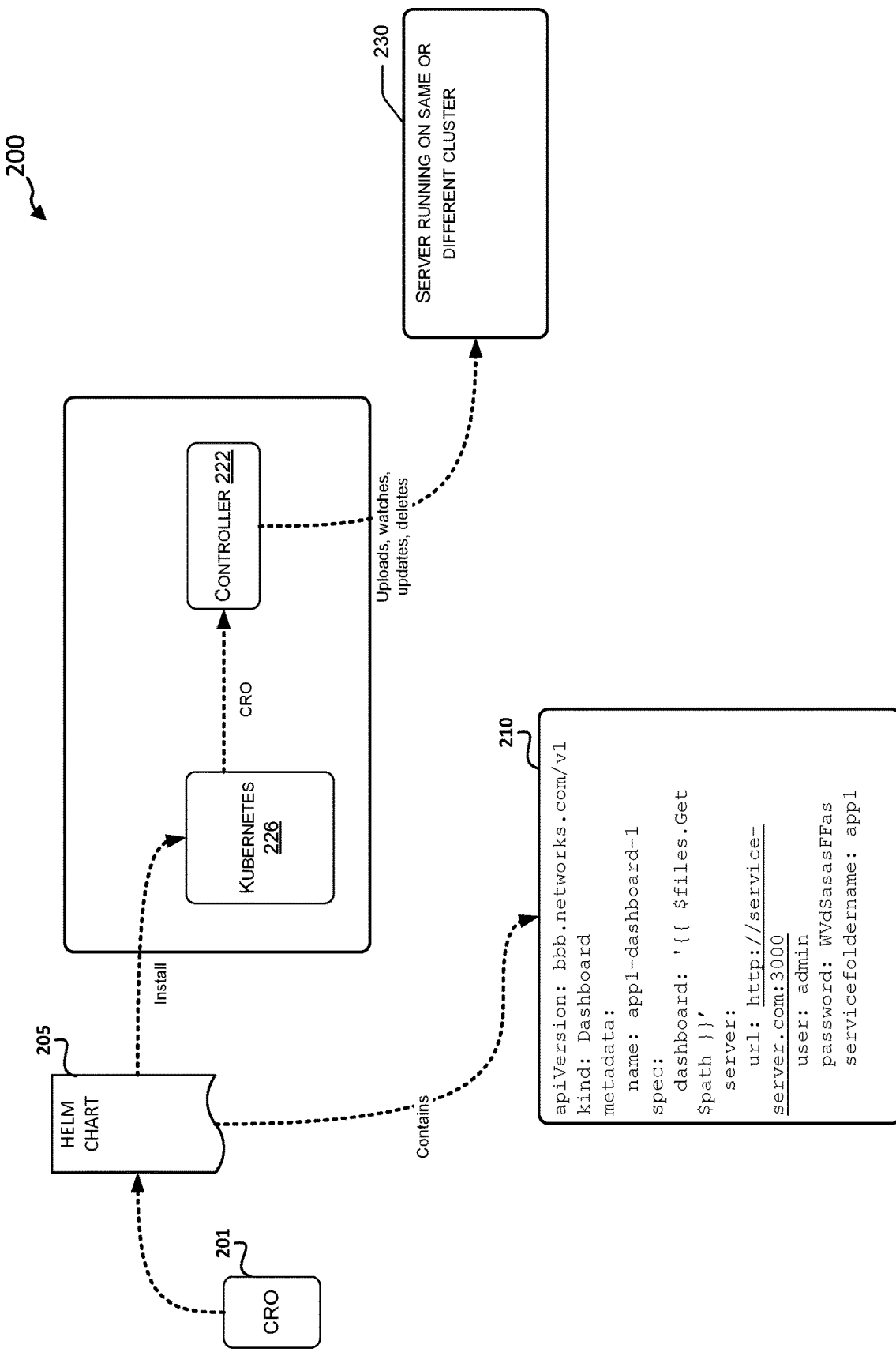
FIG. 2 illustrates an example of an off-cluster controller in accordance with the present disclosure.

Referring to FIG. 2, illustrated is an example environment 200 where the disclosed techniques can be implemented. FIG. 2 illustrates a general-purpose Kubernetes controller 222 which is configured to receive the desired state information in a cluster 230. A custom resource object 201 can be created in a different cluster which can be acted upon by a domain-specific controller running in cluster 230. The general-purpose Kubernetes controller 222, in the central cluster where the controller is running, may communicate via API calls to Kubernetes clusters 230 in order to create, watch, update, and delete objects based on user-defined inputs in the custom resource object 201. The general-purpose Kubernetes controller 220 may receive as input metadata including the API, entity URL or identifier, access credentials, desired states, and other information needed to run the controller 220. In an embodiment, the files that describe the desired set of Kubernetes resources can be defined by a Helm chart 205 that contains input metadata 210.

Figure 3:
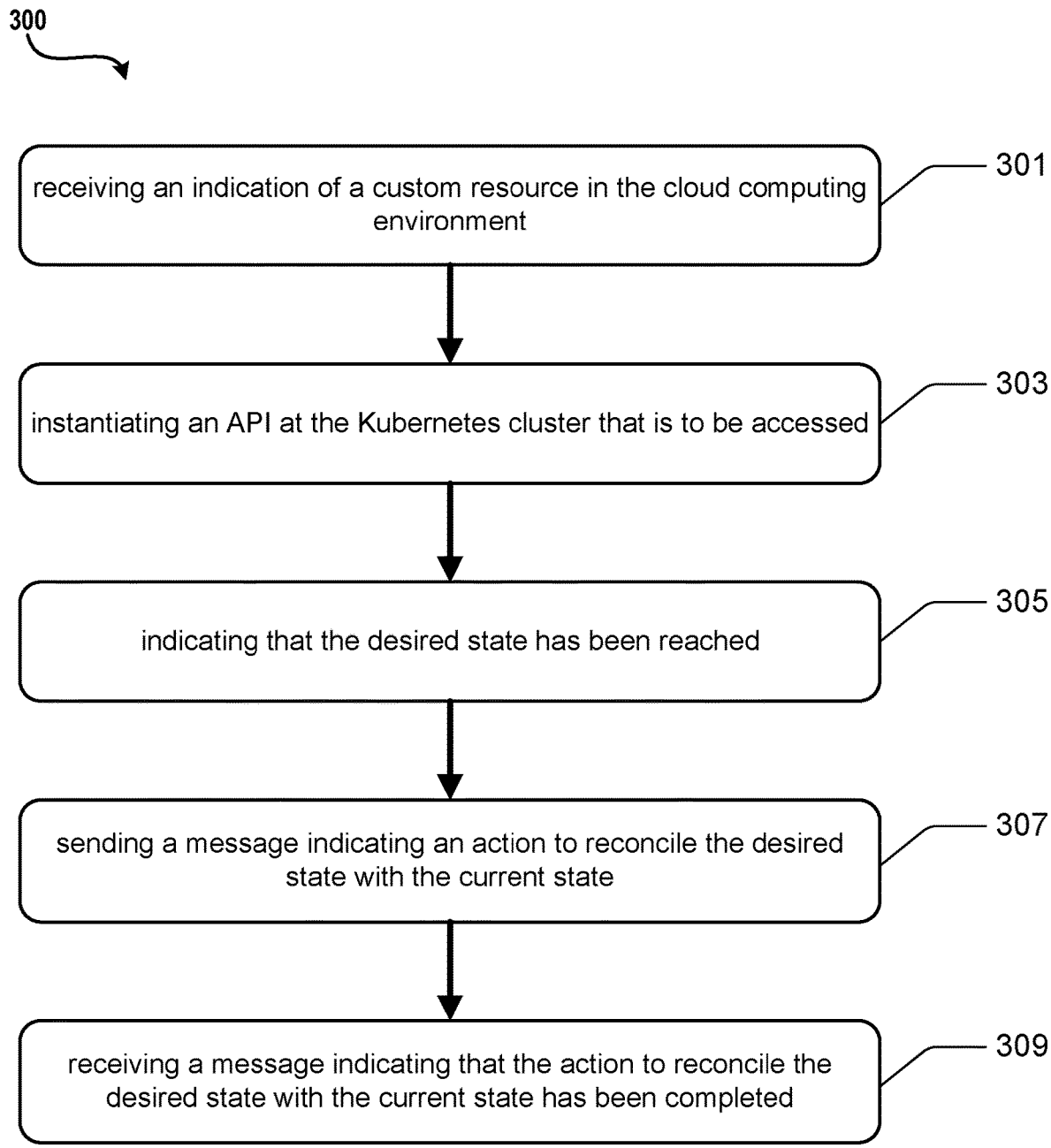
FIG. 3 is a flowchart depicting an example procedure for providing a native general-purpose controller for reconciling desired states for resources across a plurality of Kubernetes clusters in a cloud computing environment in accordance with the present disclosure.

Turning now to FIG. 3, illustrated is an example operational procedure for providing a native general-purpose controller for reconciling desired states for resources across a plurality of Kubernetes clusters in a cloud computing environment. In an embodiment, the cloud computing environment comprises a plurality of computing devices executing a plurality of Kubernetes clusters comprising one or more containers. In an embodiment, the native general-purpose controller implements a control loop for a state within a cluster. Such an operational procedure can be provided by one or more components illustrated in FIGS. 1 and 2. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 3, operation 301 illustrates receiving, by a central controller executing in the cloud computing environment, an indication of a custom resource of the cloud computing environment. In an embodiment, the custom resource defines a configuration for an object in one of the Kubernetes clusters in the cloud computing environment. In an embodiment, the configuration includes a desired state for the object. In an embodiment, the Kubernetes cluster containing the object is different from a Kubernetes cluster hosting the central controller.

Operation 301 may be followed by operation 303. Operation 303 illustrates instantiating an API at the Kubernetes cluster that is to be accessed. In an embodiment, the API is operable to provide a state of the object and allow the central controller to cause an action by the object. The central controller may execute outside of the Kubernetes clusters that are to be accessed.

Operation 303 may be followed by operation 305. Operation 305 illustrates in response to receiving, by the central controller via the API, an indication that a desired state of the object matches a current state of the object, indicating that the desired state has been reached.

Otherwise, operation 305 may be followed by operation 307. Operation 307 illustrates sending, via a corresponding API to a corresponding Kubernetes cluster, a message indicating an action to reconcile the desired state with the current state. Operation 307 may be followed by operation 309. Operation 309 illustrates receiving, via the corresponding API, a message indicating that the action to reconcile the desired state with the current state has been completed.

Figure 4:
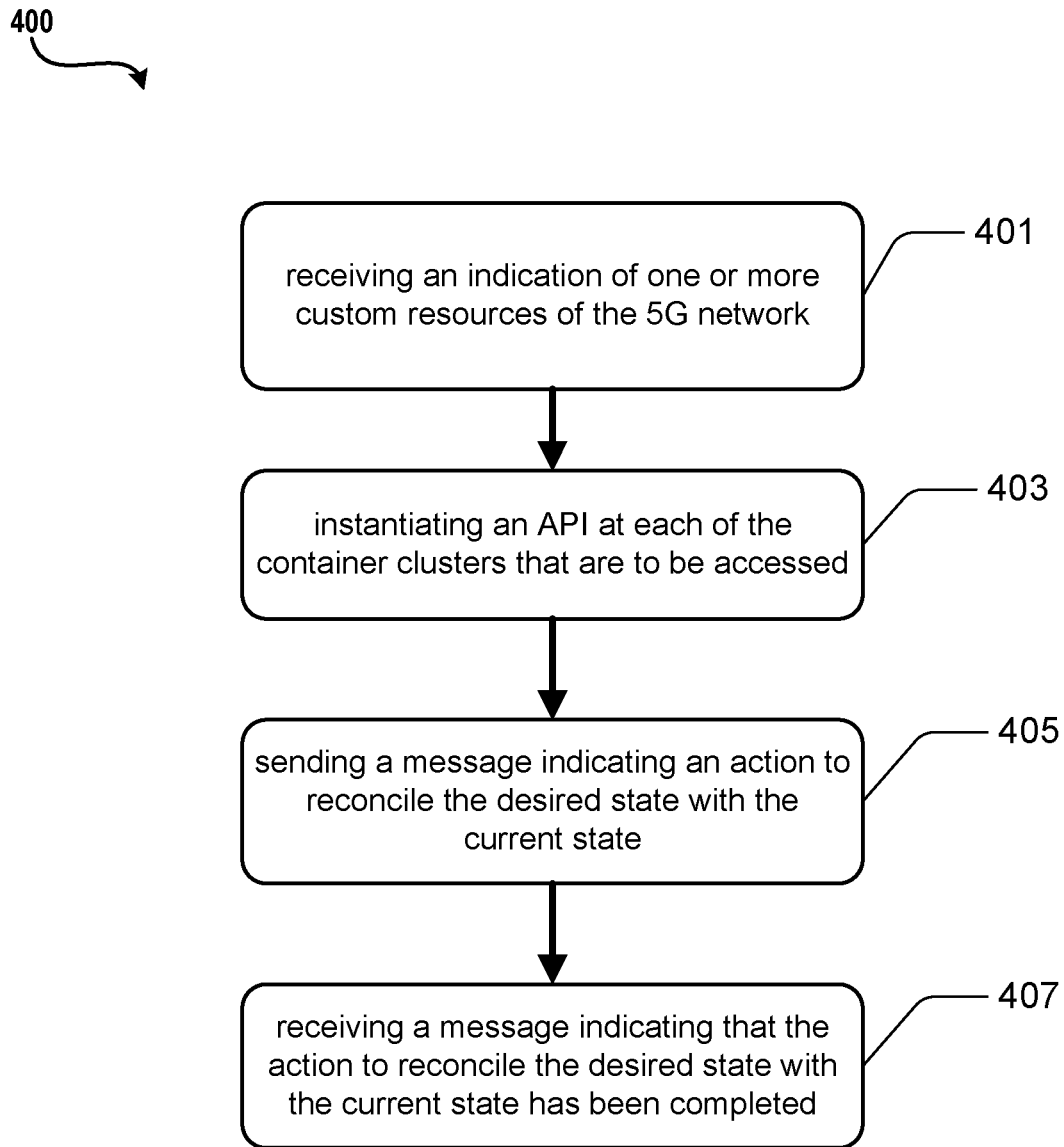
FIG. 4 is a flowchart depicting an example procedure for providing a native general-purpose controller for reconciling desired states for resources in a 5G network comprising a plurality of computing devices hosting a plurality of container clusters executing one or more network functions of the 5G network in accordance with the present disclosure.

Referring to FIG. 4, illustrated is another example operational procedure for providing a native general-purpose controller for reconciling desired states for resources in a 5G network comprising a plurality of computing devices hosting a plurality of container clusters executing one or more network functions of the 5G network. The native general-purpose controller may implement a control loop for a state within a cluster. Such an operational procedure can be provided by services shown in FIGS. 1 and 2. The operational procedure may be implemented in a system comprising one or more computing devices. Referring to FIG. 4, operation 401 illustrates receiving, by a central controller executing in the 5G network, an indication of one or more custom resources of the 5G network. The custom resources may indicate a desired state for one or more objects that require access to at least one of the container clusters in the 5G network.

Operation 401 may be followed by operation 403. Operation 403 illustrates instantiating an API at each of the container clusters that are to be accessed. The API may be operable to provide a state of the one or more objects and allow the central controller to cause an action by the one or more objects. The central controller may execute outside of the container clusters that are to be accessed.

Operation 403 may be followed by operation 405. Operation 405 illustrates in response to receiving, by the central controller via one of the APIs, an indication that a desired state of one of the objects does not match a current state of the one object, sending, via a corresponding API to a corresponding container cluster, a message indicating an action to reconcile the desired state with the current state.

Operation 405 may be followed by operation 407. Operation 407 illustrates receiving, via the corresponding API, a message indicating that the action to reconcile the desired state with the current state has been completed.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 5:
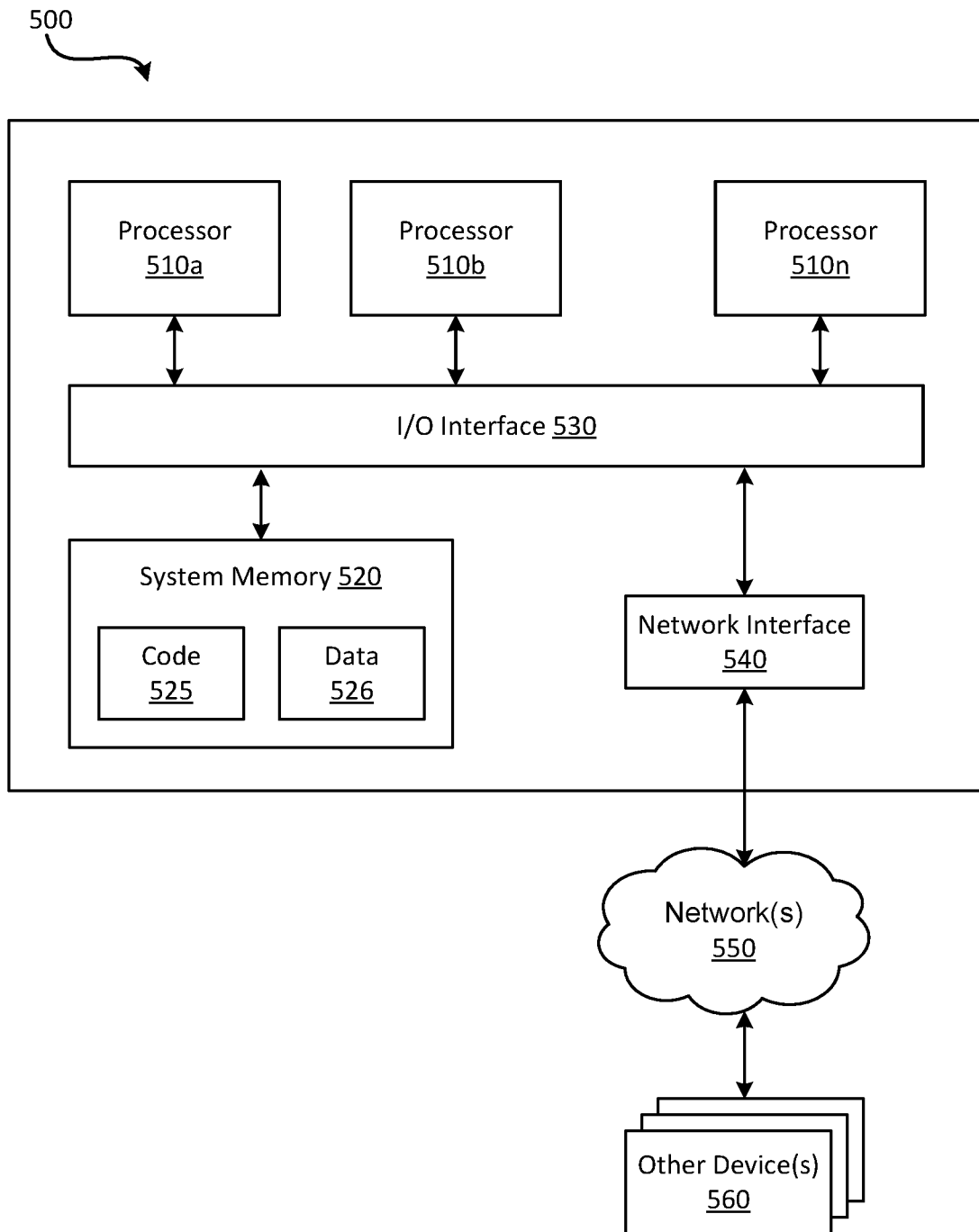
FIG. 5 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 5 illustrates such a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x56, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between the processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 4, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for providing a native general-purpose controller for reconciling desired states for resources across a plurality of Kubernetes clusters in a cloud computing environment, the cloud computing environment comprising a plurality of computing devices executing a plurality of Kubernetes clusters comprising one or more containers, the native general-purpose controller implementing a control loop for a state within a cluster, the method comprising:

receiving, by a central controller executing in the cloud computing environment, an indication of a custom resource of the cloud computing environment, the custom resource defining a configuration for an object in one of the Kubernetes clusters in the cloud computing environment, the configuration including a desired state for the object, wherein the Kubernetes cluster containing the object is different from a Kubernetes cluster hosting the central controller;

instantiating an API at the Kubernetes cluster that is to be accessed, the API operable to provide a state of the object and allow the central controller to cause an action by the object;

in response to receiving, by the central controller via the API, an indication that a desired state of the object matches a current state of the object, indicating that the desired state has been reached; and otherwise:

sending, via a corresponding API to a corresponding Kubernetes cluster, a message indicating an action to reconcile the desired state with the current state; and receiving, via the corresponding API, a message indicating that the action to reconcile the desired state with the current state has been completed.

Clause 2: The method of clause 1, wherein the central controller is configured to implement a watch/difference/act loop.

Clause 3: The method of any of clauses 1-2, wherein the custom resource includes metadata about the API, entity URL or identifier, access credentials, and desired states.

Clause 4: The method of any of clauses 1-3, further comprising sending, via the corresponding API to the corresponding Kubernetes cluster, a message indicating an action to delete one of the objects.

Clause 5: The method of any of clauses 1-4, wherein data that describe the desired state is defined by a Helm chart.

Clause 6: The method of any of clauses 1-5, wherein the desired state is created in a single Kubernetes cluster and distributed to multiple other Kubernetes clusters.

Clause 7: The method of clauses 1-6, wherein a plurality of desired states are created in a plurality of connected Kubernetes clusters that affect running instances in one or more other clusters.

Clause 8: The method of any of clauses 1-7, wherein the custom resource is created in a first cluster which is acted upon by a domain-specific controller running in the first cluster under the control of the central controller.

Clause 9: A method for providing a native general-purpose controller for reconciling desired states for resources in a 5G network comprising a plurality of computing devices hosting a plurality of container clusters executing one or more network functions of the 5G network, the native general-purpose controller implementing a control loop for a state within a cluster, the method comprising:

receiving, by a central controller executing in the 5G network, an indication of one or more custom resources of the 5G network, the custom resources indicating a desired state for one or more objects that require access to at least one of the container clusters in the 5G network;

instantiating an API at each of the container clusters that are to be accessed, the API operable to provide a state of the one or more objects and allow the central controller to cause an action by the one or more objects, wherein the central controller executes outside of the container clusters that are to be accessed;

in response to receiving, by the central controller via one of the APIs, an indication that a desired state of one of the objects does not match a current state of the one object:

sending, via a corresponding API to a corresponding container cluster, a message indicating an action to reconcile the desired state with the current state; and receiving, via the corresponding API, a message indicating that the action to reconcile the desired state with the current state has been completed.

Clause 10: The system of clause 9, wherein the central controller is configured to implement a watch/difference/act loop.

Clause 11: The system of any of clauses 9 and 10, wherein the custom resource includes metadata about the API, entity URL or identifier, access credentials, and desired states.

Clause 12: The system of any clauses 9-11, further comprising sending, via the corresponding API to the corresponding container cluster, a message indicating an action to delete one of the objects.

Clause 13: The system of any clauses 9-12, wherein files that describe the desired state is defined by a Helm chart.

Clause 14: The system of any clauses 9-13, wherein the desired state is created in a single container cluster and distributed to multiple other container clusters.

Clause 15: The system of any clauses 9-14, wherein a plurality of desired states are created in a plurality of connected container clusters that affect running instances in one or more other clusters.

Clause 16: A computer-readable storage medium having computer-executable instructions stored thereupon which, when executed by one or more processors of a computing device, cause the computing device to:

receive an indication of one or more custom resources of the cloud computing environment, the custom resources indicating a desired state for one or more objects that require access to at least Kubernetes cluster in a cloud computing environment;

instantiate an API at each of the Kubernetes clusters that are to be accessed, the API operable to provide a state of the one or more objects and allow the central controller to cause an action by the one or more objects, wherein the central controller executes outside of the Kubernetes clusters that are to be accessed;

in response to receiving an indication that a desired state of one of the objects does not match a current state of the one object:

send, via a corresponding API to a corresponding Kubernetes cluster, a message indicating an action to reconcile the desired state with the current state; and receive, via the corresponding API, a message indicating that the action to reconcile the desired state with the current state has been completed.

Clause 17: The computer-readable storage medium of clause 16, wherein the custom resource includes metadata about the API, entity URL or identifier, access credentials, and desired states.

Clause 18: The computer-readable storage medium of any of clauses 16 and 17, further comprising sending, via the corresponding API to the corresponding Kubernetes cluster, a message indicating an action to delete one of the objects.

Clause 19: The computer-readable storage medium of any of the clauses 16-18, wherein the desired state is created in a single Kubernetes cluster and distributed to multiple other Kubernetes clusters.

Clause 20: The computer-readable storage medium of any of the clauses 16-19, wherein users a plurality of desired states are created in a plurality of connected Kubernetes clusters that affect running instances in one or more other clusters.

What is claimed is:

1. A method for providing a central controller configured as a native general-purpose controller for reconciling desired states for resources across a plurality of Kubernetes clusters in a cloud computing environment, the cloud computing environment comprising a plurality of computing devices executing a plurality of Kubernetes clusters comprising one or more containers, the native general-purpose controller implementing a control loop for a state within a cluster, the method comprising:

receiving, by a central controller executing in the cloud computing environment, an indication of a custom resource of the cloud computing environment, the custom resource defining a configuration for an object in one of the Kubernetes clusters in the cloud computing environment, the configuration including a desired state for the object, wherein the Kubernetes cluster containing the object is different from a Kubernetes cluster hosting the central controller;

instantiating an API at the Kubernetes cluster that is to be accessed, the API operable to provide a state of the object and allow the central controller to cause an action by the object;

in response to receiving, by the central controller via the API, an indication that a desired state of the object matches a current state of the object, indicating that the desired state has been reached; and otherwise:

sending, via a corresponding API to a corresponding Kubernetes cluster, a message indicating an action to reconcile the desired state with the current state; and receiving, via the corresponding API, a message indicating that the action to reconcile the desired state with the current state has been completed.

2. The method of claim 1, wherein the central controller is configured to implement a watch/difference/act loop.

3. The method of claim 1, wherein the custom resource includes metadata about the API, entity URL or identifier, access credentials, and desired states.

4. The method of claim 1, further comprising sending, via the corresponding API to the corresponding Kubernetes cluster, a message indicating an action to delete one of the objects.

5. The method of claim 1, wherein data that describe the desired state is defined by a Helm chart.

6. The method of claim 1, wherein the desired state is created in a single Kubernetes cluster and distributed to multiple other Kubernetes clusters.

7. The method of claim 1, wherein a plurality of desired states are created in a plurality of connected Kubernetes clusters that affect running instances in one or more other clusters.

8. The method of claim 1, wherein the custom resource is created in a first cluster which is acted upon by a domain-specific controller running in the first cluster under the control of the central controller.

9. A method for providing a native general-purpose controller for reconciling desired states for resources in a 5G network comprising a plurality of computing devices hosting a plurality of container clusters executing one or more network functions of the 5G network, the native general-purpose controller implementing a control loop for a state within a cluster, the method comprising:

receiving, by a central controller executing in the 5G network, an indication of one or more custom resources of the 5G network, the custom resources indicating a desired state for one or more objects that require access to at least one of the container clusters in the 5G network;

instantiating an API at each of the container clusters that are to be accessed, the API operable to provide a state of the one or more objects and allow the central controller to cause an action by the one or more objects, wherein the central controller executes outside of the container clusters that are to be accessed;

in response to receiving, by the central controller via one of the APIs, an indication that a desired state of one of the objects does not match a current state of the one object:

sending, via a corresponding API to a corresponding container cluster, a message indicating an action to reconcile the desired state with the current state; and receiving, via the corresponding API, a message indicating that the action to reconcile the desired state with the current state has been completed.

10. The method of claim 9, wherein the central controller is configured to implement a watch/difference/act loop.

11. The method of claim 9, wherein the custom resource includes metadata about the API, entity URL or identifier, access credentials, and desired states.

12. The method of claim 9, further comprising sending, via the corresponding API to the corresponding container cluster, a message indicating an action to delete one of the objects.

13. The method of claim 9, wherein files that describe the desired state is defined by a Helm chart.

14. The method of claim 13, wherein the desired state is created in a single container cluster and distributed to multiple other container clusters.

15. The method of claim 9, wherein a plurality of desired states are created in a plurality of connected container clusters that affect running instances in one or more other clusters.

16. A computer-readable storage medium having computer-executable instructions stored thereupon which, when executed by one or more processors of a computing device, cause the computing device to:

receive an indication of one or more custom resources of a cloud computing environment, the custom resources indicating a desired state for one or more objects that require access to at least Kubernetes cluster in the cloud computing environment;

instantiate an API at each of the Kubernetes clusters that are to be accessed, the API operable to provide a state of the one or more objects and cause an action by the one or more objects;

in response to receiving an indication that a desired state of one of the objects does not match a current state of the one object:

send, via a corresponding API to a corresponding Kubernetes cluster, a message indicating an action to reconcile the desired state with the current state; and receive, via the corresponding API, a message indicating that the action to reconcile the desired state with the current state has been completed.

17. The computer-readable storage medium of claim 16, wherein the custom resource includes metadata about the API, entity URL or identifier, access credentials, and desired states.

18. The computer-readable storage medium of claim 16, further comprising sending, via the corresponding API to the corresponding Kubernetes cluster, a message indicating an action to delete one of the objects.

19. The computer-readable storage medium of claim 16, wherein the desired state is created in a single Kubernetes cluster and distributed to multiple other Kubernetes clusters.

20. The computer-readable storage medium of claim 19, wherein users a plurality of desired states are created in a plurality of connected Kubernetes clusters that affect running instances in one or more other clusters.

* * * * *